July 24, 1928.
T. Q. PREECE
BIT FOR HORSES
Filed Nov. 6, 1925
1,678,532
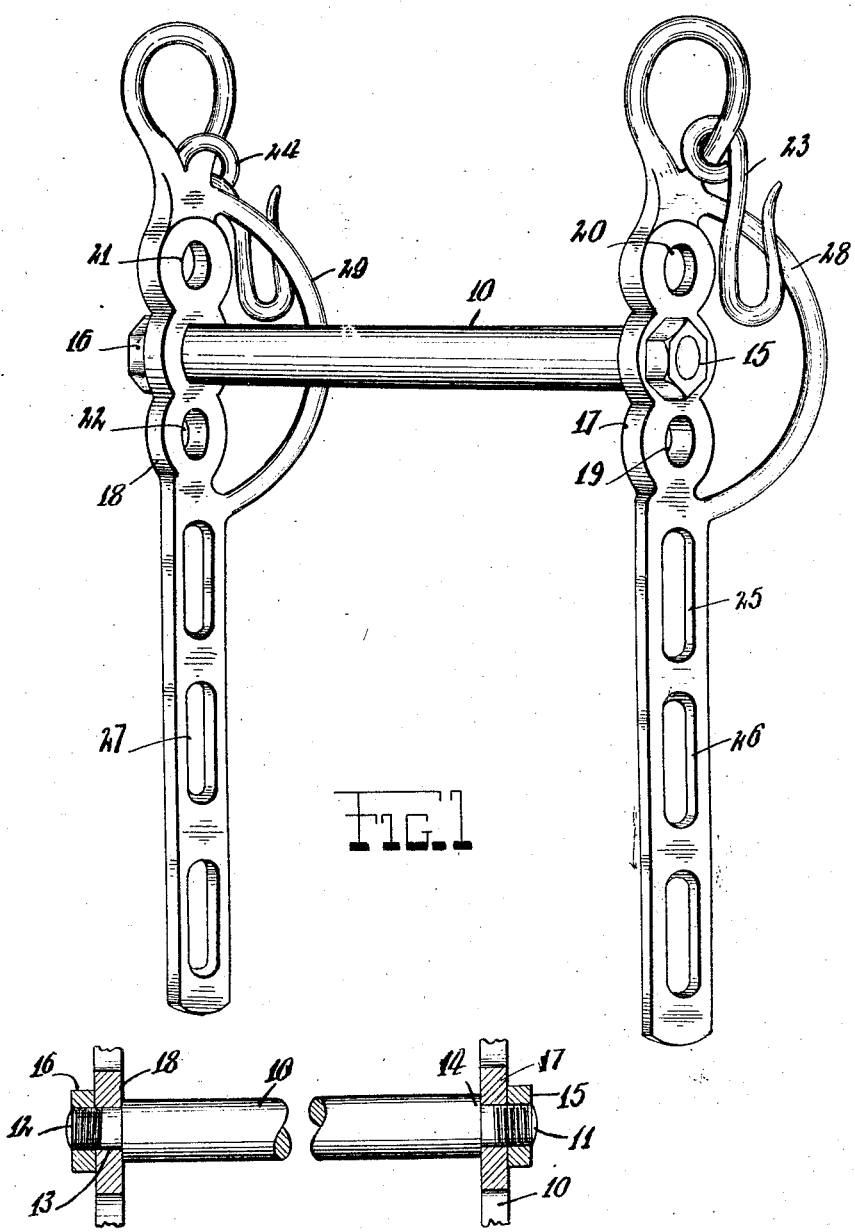

Patented July 24, 1928.

1,678,532

UNITED STATES PATENT OFFICE.

TERENCE Q. PREECE, OF WESTBURY, NEW YORK.

BIT FOR HORSES.

Application filed November 6, 1925. Serial No. 67,247.

This invention relates to improvements in bits for horses, ponies and like animals, and its chief object is to provide an article of this character in which it is possible to shift the mouth piece from one position in the side members to another; there being in the said side member a series of holes for this purpose.

Another object is a copper facing, or covering on the said mouth piece.

Other objects are beauty and symmetry of design, and strength and simplicity of construction.

In the accompanying drawings;

Fig. 1 shows a perspective view of the bit.

Fig. 2 shows a fragmentary front view of the mouth piece, with portions of the side members in section.

A brief description of the elementary parts is as follows;

A mouth piece 10, preferably copper faced, or covered, has at its extremities reduced portions 11 and 12 and shoulders 13 and 14, the reduced portions being threaded to receive the jamb nuts 15 and 16 which bear against the side members 17 and 18 securing them in position against the shoulders before mentioned. The side members 17 and 18 are provided with holes as shown at 19, 20, 21, 22 etc., for the adjustment of the mouth piece 10. Hooks 23 and 24 are adapted to be secured to a curb chain, and slots as shown at 25, 26, 27, etc., are provided for the attachment of reins. Other reins may be secured to the members as shown at 28 and 29.

For the control of highly sensitive animals; as for instance polo ponies, it is desirable to keep the mouth of the said animals in a well moistened condition and the construction and the copper finish of this bit have been found to produce this effect. A runaway horse, when finally stopped discloses a very dry mouth. It appears as though after strenuous exertion the flow of saliva stops. But with the present invention, the copper coating on the bit stimulates the flow of saliva, and the animal feels better and is capable of much greater exertion. Presumably the copper coating very slowly dissolves and causes the stimulated flow. While large quantities of copper salts taken internally may be poisonous, the quantity dissolving from the bit is practically harmless. It has further been found that the permanent placing of the mouth piece with relation to the curb members has a tendency to harden the jaws in one spot thus causing the animal to answer less readily to the action of the driver. This also has been obviated by the means for adjustment provided in the bit shown and described herewith.

While I have shown the preferred embodiment of my invention, I do not wish to be limited to these exact details of form and construction, but claim the right to such minor modifications as are within the scope of the appended claims.

Having thus described my invention, what I claim as new and desire to secure by Letters Patent, is as follows:

1. In a bit of the class described, a mouth piece, a copper coating on said mouth piece, adapted to slowly react with the saliva in the mouth of a horse forming copper salts for stimulating the salivary gland to prevent drying of the mouth of the horse.

2. In a bit of the class described, a mouth piece, a metallic covering on said mouth piece comprising material adapted to react with the saliva in the mouth of a horse for producing, soluble metallic salts adapted to stimulate the salivary glands of said horse for preventing drying of the mouth thereof.

In testimony whereof I have affixed my signature.

TERENCE Q. PREECE.